J. F. CRAVEN.
RECEPTACLE FOR CONTAINING AND DISCHARGING SOLID AND SEMISOLID SUBSTANCES.
APPLICATION FILED OCT. 14, 1910.

1,025,513.

Patented May 7, 1912.

2 SHEETS—SHEET 1.

WITNESSES
Chas. Totterman
Mary E. Cahoon

INVENTOR
James F. Craven,
By Fred'k W. Winter
Attorney

J. F. CRAVEN.
RECEPTACLE FOR CONTAINING AND DISCHARGING SOLID AND SEMISOLID SUBSTANCES.
APPLICATION FILED OCT. 14, 1910.
1,025,513.
Patented May 7, 1912.
2 SHEETS—SHEET 2.
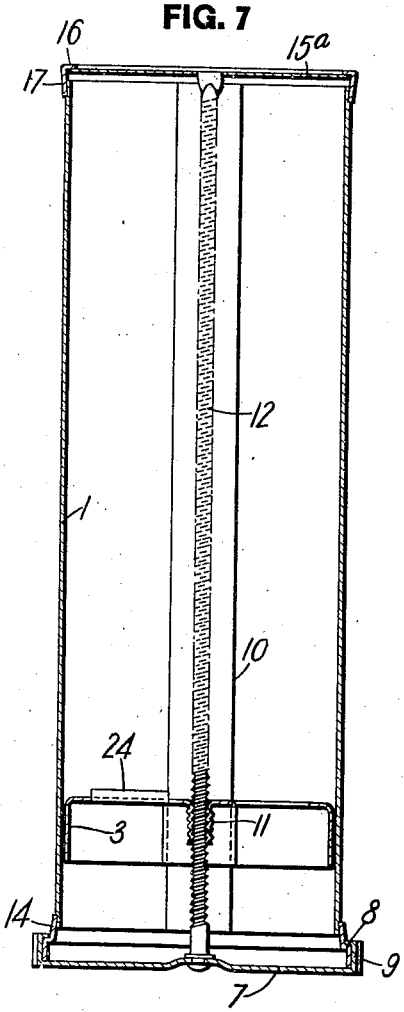
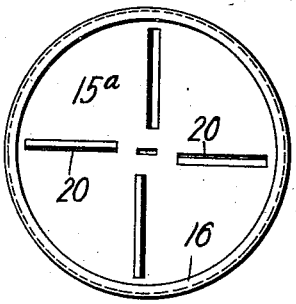
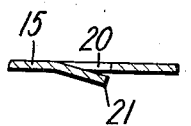
WITNESSES
INVENTOR

UNITED STATES PATENT OFFICE.

JAMES F. CRAVEN, OF PITTSBURGH, PENNSYLVANIA, ASSIGNOR TO CRAVEN ENGINEERING COMPANY, OF PITTSBURGH, PENNSYLVANIA, A CORPORATION OF PENNSYLVANIA.

RECEPTACLE FOR CONTAINING AND DISCHARGING SOLID AND SEMISOLID SUBSTANCES.

1,025,513.     Specification of Letters Patent.     Patented May 7, 1912.

Application filed October 14, 1910. Serial No. 587,085.

*To all whom it may concern:*

Be it known that I, JAMES F. CRAVEN, a resident of Pittsburgh, in the county of Allegheny and State of Pennsylvania, have invented a new and useful Improvement in Receptacles for Containing and Discharging Solid and Semisolid Substances, (Case 6,) of which the following is a specification.

This invention relates to a receptacle for containing, storing, transporting and discharging solid and semi-solid substances which are to be used in the form of small pieces, shavings or comminuted particles.

The device is intended more particularly for putting up paraffin or other similar waxes which are to be used for laundry and other purposes and which can be cut or shaved to permit of convenient use. The invention, however, is not limited to this particular use, but the device is adapted for putting up in a substantially sealed condition food stuffs such as chocolate, or soap or any solid or wax-like substance, and shaving or comminuting the same when being discharged from the container.

The arrangement comprises the construction and arrangement of parts hereinafter described and claimed.

Figure 1:
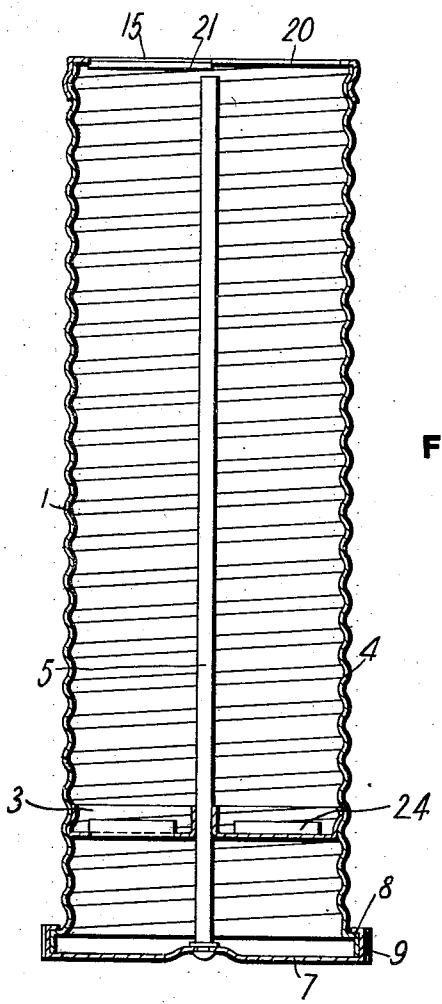
Figure 6:
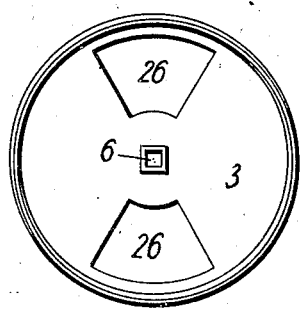
Figure 2:
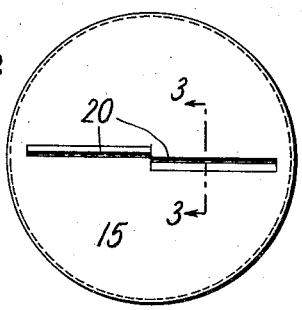
Figure 5:
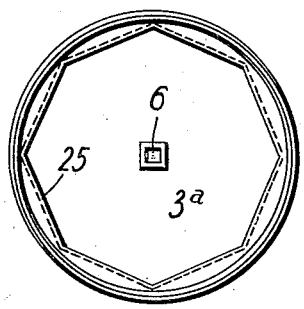
Figure 5A:

In the accompanying drawing Figure 1 is a vertical section through one form of the device; Fig. 2 is an end view of the discharge end of the same; Fig. 3 is a view on an enlarged scale on the line 3—3, Fig. 2; Fig. 4 is a plan view showing a modified form of discharge end; Figs. 5 and 6 are plan views of modified forms of pistons; Fig. 5ª is a sectional detail of the piston shown in Fig. 5; Fig. 7 is a vertical section through a modified form of the device; and Fig. 8 is an end view of the same.

The receptacle or container proper may be of any desired size or shape and built up or constructed in any desired way and from any desired material. As shown, the body of the receptacle is formed as a substantially cylindrical tube 1, which may be of sheet metal as shown in Fig. 1 or other thin substance, or of paste or paper board, as shown in Fig. 7. The paraffin, wax or other substance can be filled into this receptacle in any desired way, such as pouring the same thereinto when semi-fluid and allowing the same to set therein, but preferably by molding the same in cylindrical or other form.

The material is discharged from the receptacle by forcing the same out endwise. This may be effected by various means, and is shown as effected by means of a piston or follower 3 endwise movable in the receptacle by suitable means.

As shown in Fig. 1 the tub 1 is provided internally with screw threads 4 and the piston or follower 3 is threaded on its periphery to engage said internal threads, so that when said piston is rotated it travels longitudinally in said tube. The means for rotating the piston 3 comprises a rod 5 of square or other non-circular cross section and extending through a similarly shaped hole 6 in the piston or follower and slidable in said hole. The rotation of this rod carries the piston with it. The rod may be rotated by any suitable means. Fig. 1 shows for this purpose a cap 7 to which the rod is secured, said cap having its edge bent over a flange or shoulder 8 on the end of tube 1 and being thereby held against movement lengthwise of the tube 1 but free to rotate thereon. The peripheral edge of cap 7 is knurled or roughened as shown at 9 to afford a good grip when rotating the same.

With the form shown in Fig. 7 the movement of piston 3 lengthwise in the tube 1 is effected by the following means: The piston 3 is prevented from turning in the tube by providing the same with a groove engaging a longitudinal rib 10 on the inner face of the tube, which rib in the case of a paper tube is formed by pasting a strip of paste board on the inner face of the tube, while in case of a sheet metal tube the usual crimped seam of such tube forms the necessary inwardly projecting rib. The piston 3 is provided with a threaded opening 11 which is engaged by a threaded rod or screw 12, so that the rotation of the latter necessarily causes the non-rotatable piston 3 to move longitudinally in the tube 1. Any suitable means may be provided for rotating the rod or screw, the means shown comprising a cap 7 similar to that to which the rod is secured in Fig. 1, said cap being rotatable but endwise immovable on the receptacle, such as by bending its edge underneath an annular flange or shoulder 8, which in this case is formed on a collar 14 which is crimped or otherwise secured to the paper tube 1. The cap 7 in both embodiments shown serves both as a means for rotating the rod 5 or screw 12 and also as a closure for one end of the tube 1. The opposite end of the tube is the discharge end for the substance, and this is closed by means of a metal disk 15, or 15ª, the disk 15 in Fig. 1 being stationary and secured to the tube 1, while in Figs. 7 and 8 the disk 15ª is rotatable and secured to the end of the threaded rod 12, the edges of said disk preferably being covered by an inturned flange 16 on a collar 17 which is crimped or otherwise secured to the end of tube 1. The inturned flange 16 merely serves as a support or steadying means for the edge of the rotating disk 15ª.

The disks 15 or 15ª are provided with suitable means for shaving, cutting or comminuting the wax or other material as it is being forced endwise. As shown in Figs. 2, 3 and 8 said disks are provided with a plurality of radially arranged slits 20 one edge of which is turned inwardly to form a cutting edge 21 which cuts or shaves the material as the latter is forced endwise against said disk. In Fig. 2 a single diametrical slit, forming two radial slits, is shown, while in Fig. 8 four radial slits are shown. The modification shown in Fig. 4 has the disk provided with a series of punched openings 22 which form greater projections which will grate or comminute the material as the latter is forced endwise against the same. The cutters of the form shown in Figs. 2, 3 and 8 are well adapted for waxy substances, such as paraffin, while the grater such as shown in Fig. 4 is best adapted for materials like chocolate which must be reduced to a fairly fine condition.

The body of material in the container must either rotate with the piston 3, as in Fig. 1 where the shaving disk is stationary, or be held against rotation on the piston, as in Fig. 8 where the shaving disk is rotary, while being forced endwise and in order that the cutters or graters can effectively act thereon. This may be effected in various ways. As shown in Figs. 1 and 7 the piston 3 is provided with one or more radial projections 24 which engage the cylinder of material. Figs. 5 and 5ª show the piston 3ª provided with an upturned flange 25 which in Fig. 5 is shown of polygonal or other shape into which the cylinder of material fits, while Fig. 6 shows the piston provided with holes 26 into which a portion of the cylinder fits. In all cases the cylinder of material is held against rotation relatively to the piston and must either rotate with the rotatable piston while being pressed against the stationary shaving disk, or is held stationary with the non-rotatable piston while being forced against the rotary shaving disk. Substances which set in substantially solid form can be prepared for the receptacle by molding the same in substantially cylindrical form with a central opening therethrough for the passage of the rod 5 or threaded rod 12.

The materials are preferably put up in this receptacle at the factory and are shipped in this condition. The receptacles are comparatively cheap so that when the contents are exhausted they can be thrown away. They serve to protect the contents from dirt and other impurities, and form convenient packages for the same, and enable the contents to be used in any desired quantity, and will retain the remnants or unused portion of the substance in a practically sealed or closed condition. The device is convenient to use, it merely being necessary to grasp the tube 1 with one hand and with the other hand rotate the rod 5 or 12 thereby simultaneously discharging the substance and reducing the same to small pieces.

What I claim is:

1. A device of the character described, comprising a suitable receptacle for the substance, end closures for the receptacle, one being non-removable therefrom, means movable the full length of said receptacle for forcing the substance endwise out of the same, connections between said non-removable closure and said means so arranged that said means may be positively moved throughout its range of travel by said closure, and said other end closure being constructed and arranged to reduce the substance to small pieces while being forced out of the receptacle.

2. A device of the character described, comprising a receptacle for the desired substance, a follower movable lengthwise in said receptacle for its full length and arranged to force the substance out of the receptacle, a rotating member extending longitudinally of the receptacle and arranged to operatively engage the follower throughout its range of travel for actuating the same, an end closure at one end of the receptacle for rotating said member, and a cutting or comminuting device at the other end of the receptacle operative by the rotation of said rotary member and arranged to reduce the substance to small pieces while being discharged therefrom.

3. A device of the character described comprising a receptacle arranged to contain the desired substance, a follower in said receptacle arranged to move longitudinally therein and force the substance out of the receptacle, a rotary member extending longitudinally of the receptacle and connected to the follower to actuate the same, an end closure rotatably mounted on the receptacle for rotating said member and a disk at the discharge end of the receptacle and operative by the rotation of the rotary member and provided with cutting or comminuting openings.

4. A device of the character described comprising a container for the substance, a follower in the container for moving the substance endwise, said follower being movable from end to end of the container, an end closure rotatably secured to one end of the container, and arranged to move the follower away therefrom, and means at the other end of the container for converting the substance into small pieces.

5. A device of the character described comprising a container for the substance, a follower in the container for moving the substance endwise, an end closure rotatably secured to one end of the container and endwise immovable with reference thereto, and arranged to move the follower away therefrom, and means at the other end of the container for converting the substance into small pieces, said means being secured to the container and forming an end closure therefor.

6. A device of the character described comprising a container for the substance, a follower in the container for moving the substance endwise, an end closure rotatably secured to one end of the container, and arranged to move the follower away therefrom, and means at the other end of the container for converting the substance into small pieces, said means being rotatably secured to the container and forming an end closure therefor, the end closures being non-removable from the container.

7. A device of the character described comprising a paper tube having shoulders at each end thereof, end closures for the tube bearing against the shoulders and non-removable from the tube, a follower in the tube and arranged to be moved endwise by one of said end closures, said other end closure being constructed and arranged to convert the substance into small pieces as it is moved endwise.

In testimony whereof, I have hereunto set my hand.

JAMES F. CRAVEN.

Witnesses:
F. W. WINTER,
SUE B. FRITZ.